United States Patent [19]

Thomas

[11] Patent Number: 4,701,924
[45] Date of Patent: Oct. 20, 1987

[54] FREQUENCY DISCRIMINATING LASER

[75] Inventor: Michael D. Thomas, Hudson, N.H.

[73] Assignee: Sanders Associates, Inc., Nashua, N.H.

[21] Appl. No.: 765,744

[22] Filed: Aug. 15, 1985

[51] Int. Cl.[4] .......................... H01S 3/098; H01S 3/10
[52] U.S. Cl. .......................................... 372/19; 372/28
[58] Field of Search ............................. 372/19, 20, 28

[56] References Cited

U.S. PATENT DOCUMENTS 3,575,667  4/1971  Smith .................................... 372/19

Primary Examiner—Gene Wan
Attorney, Agent, or Firm—Richard I. Seligman

[57] ABSTRACT

A laser which discriminates against a high gain transition in laser materials allowing a low gain transition to oscillate is provided by using more than two mirrors in the laser cavity which are highly reflective at the frequency of the high gain transition.

5 Claims, 1 Drawing Figure

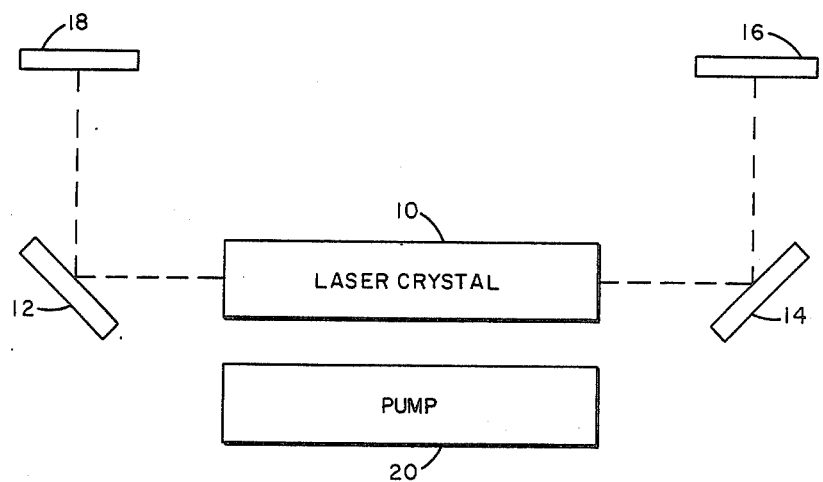

FREQUENCY DISCRIMINATING LASER

The invention herein described was made in the course of or under a contract or subcontract thereunder with the Department of the Air Force.

BACKGROUND OF THE INVENTION

Most applications which use lasers require that the laser output be at a particular frequency. Many laser materials have more than one transition and, thus, can be made to lase at multiple frequencies. A typical laser includes a laser crystal contained within a resonator which is made up of two mirrors one of which is generally highly reflective and the other which is partially transmissive. In the past the selection of the proper transition of the laser was achieved by applying appropriate dielectric coatings on at least one of the mirrors to determine the reflectivity profile of the mirror and, thus, in the main reflect only the laser radiation of the desired frequency. This solution does not always work since coatings cannot always be manufactured to the proper specifications to permit reflectivity at the desired wavelength and not allow reflectivity at the frequencies of other transitions of the laser. Even if such coatings are available, they are often extremely expensive.

The problem becomes even greater in lasers where the desired frequency is one of a low gain transition of the laser and when discrimination is required against higher gain transitions.

Accordingly, it is an object of this invention to provide a laser resonator which provides improved frequency discrimination.

It is another object of this invention to provide a laser which allows discrimination against high gain transitions.

SUMMARY OF THE INVENTION

Briefly, good frequency discrimination in a laser is provided by utilizing more than two mirrors in a laser cavity. In one embodiment of the invention, two mirrors are arranged at a forty-five degree angle on the longitudinal axis of the laser crystal both of which are highly reflective at the desired frequency and highly transmissive at the frequency to be discriminated against. The cavity also includes two additional mirrors one of which is highly reflective at the desired frequency and highly transmissive at the undesirable frequency, and the other of which mirrors is highly transmissive at the undesirable frequency and partially transmissive at the frequency of interest.

BRIEF DESCRIPTION OF THE DRAWING

The above-mentioned and other features and objects of this invention will become more apparent by reference to the following description taken in conjunction with the accompanying drawing which is a block diagram of a laser configured according to the principles of the invention.

DESCRIPTION OF A PREFERRED EMBODIMENT

Referring now to the drawing, there is illustrated thereby a preferred embodiment of the invention. The laser includes a laser crystal 10 and a cavity having four mirrors 12, 14, 16 and 18. The laser also includes a flash lamp or other crystal exitation means 20. In this embodiment it is desirable to cause lasing at one frequency and discriminate against lasing at a second frequency. The mirrors 12 and 14 are arranged at a 45 degree angle with respect to the axis of crystal 10 and are configured to be highly reflective at the frequency of interest and highly transmissive at the undesired frequency. Mirror 16 is configured to be highly reflective at the frequency of interest and highly transmissive at the undesirable frequency. Mirror 18 is configured to be partially reflective at the frequency of interest and highly transmissive at the undesired frequency.

With this arrangment of four mirrors all of which are highly transmissive at the frequency to be discriminated against, the opportunity to delete the undesired frequency from the laser cavity is greatly increased. In conventional lasers only two mirrors would be employed which would be highly transmissive at the undesired frequency and therefore only so much of the radiation at this frequency is deleted. However in this embodiment with four lasers clearly the amount of undesirable radiaton which is deleted from the cavity and not reflected is much greater.

In one specific embodiment of the invention, laser crystal 10 is a Nd:YAG crystal. The object of this embodiment was to obtain lasing at 1.32 microns and discriminate against the higher transition wavelength of 1.06 microns. For this embodiment mirrors 12, 14 and 16 were highly reflective at 1.32 microns and highly transmissive at 1.06 microns. Mirror 18 was highly transmissive at 1.06 microns and partially transmissive at 1.32 microns. In particular, mirror 18 reflected 52% of the radiation incident thereon. While the embodiment employed mirrors 12 and 14 at 45 degrees to the pump cavity other angles can be used instead. In this embodiment much better frequency discrimination was obtained than that available in conventional two mirror cavities and in particular the 1.32 micron low gain tranition was permitted to oscillate while the 1.06 micron high gain transition did not oscillate.

While the laser described is used to discriminate between a low gain transition and a high gain transition of a Nd:YAG laser, the principles thereof are equally applicable to any laser which has multipe transitions and wherein it is desirable only to obtain lasing at one of the transitions. Thus, it is to be understood that the embodiment shown is illustrative only, and that many variations and modifications may be made without departing from the principles of the invention herein disclosed and defined by the appended claims.

I claim:

1. A laser for discriminating between a higher gain transition and a lower gain transition to permit the laser to lase at the lower gain transition, comprising:
    a laser cavity, including more than two mirrors each of which is highly transmissive at the frequency of the higher gain transition, one of which is partially reflective at the frequency of the lower gain transition, and all but said one of which are highly reflective at the frequency of the lower gain transition;
    an active laser medium disposed within said cavity; and
    means for pumping said active laser medium.
2. The laser as defined in claim 1, wherein the radiation within the cavity travels through the laser medium in two directions.
3. The laser as defined in claim 1, wherein the path of radiation in the cavity is discontinuous.
4. The laser as defined in claim 1, wherein said cavity includes four mirrors three of which are highly reflective at the lower gain transition and the other of which is partially reflective at the lower gain transition.
5. The laser as defined in claim 4, wherein said laser medium is Nd:YAG and the lower gain transition is 1.32 microns and the higher gain transition is 1.06 microns.

* * * * *